US012713239B2

(12) United States Patent
Santhana Krishnan et al.

(10) Patent No.: US 12,713,239 B2
(45) **Date of Patent: *Aug. 18, 2026**

(54) WIRELESS BATTERY MANAGEMENT SYSTEM SETUP

(71) Applicant: TEXAS INSTRUMENTS INCORPORATED, Dallas, TX (US)

(72) Inventors: Archanaa Santhana Krishnan, Worchester, MA (US); Alexis Justine Burnight, Dallas, TX (US); Ariton E. Xhafa, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 72 days.

This patent is subject to a terminal disclaimer.

(21) Appl. No.: 18/779,478

(22) Filed: Jul. 22, 2024

(65) Prior Publication Data

US 2024/0381089 A1 Nov. 14, 2024

Related U.S. Application Data

(63) Continuation of application No. 17/399,793, filed on Aug. 11, 2021, now Pat. No. 12,047,778.

(51) Int. Cl.
*H04L 29/06* (2006.01)
*H04L 9/08* (2006.01)
(Continued)

(52) U.S. Cl.
CPC ......... *H04W 12/069* (2021.01); *H04L 9/0822* (2013.01); *H04L 9/0861* (2013.01);
(Continued)

(58) Field of Classification Search
CPC ............. H04W 12/069; H04W 12/041; H04W 12/0431; H04W 12/50; H04L 9/0822;
(Continued)

(56) References Cited

U.S. PATENT DOCUMENTS

| | | | | |
|---|---|---|---|---|
| 8,495,372 | B2 * | 7/2013 | Bailey | H04L 9/3226 713/172 |
| 12,381,408 | B2 * | 8/2025 | Xhafa | H02J 7/0047 |

(Continued)

FOREIGN PATENT DOCUMENTS

| | | |
|---|---|---|
| CN | 1956449 A | 5/2007 |
| CN | 112291179 A | 1/2021 |

(Continued)

OTHER PUBLICATIONS

Mirzadeh, Shahab, Haitham Cruickshank, and Rahim Tafazolli. "Secure device pairing: A survey." IEEE Communications Surveys & Tutorials 16.1 (2013): 17-40. (Year: 2013).*

*Primary Examiner* — Shawnchoy Rahman
(74) *Attorney, Agent, or Firm* — Carl G. Peterson; Frank D. Cimino

(57) ABSTRACT

Aspects of this description provide for a computer program product comprising computer executable instructions. In at least some examples, the instructions are executable by a controller to cause the controller to broadcast, in a data frame, a scan request to a node, the scan request including a certificate of the controller and a public authentication key of the controller, receive, in the data frame, a scan response from the node, the scan response including a certificate of the node and a public authentication key of the node, and perform pairing between the controller and the node based on the public authentication key of the node and a private authentication key of the controller.

20 Claims, 3 Drawing Sheets

400

402 — BROADCASTING A FIRST MESSAGE INCLUDING A SCAN REQUEST, A FIRST CERTIFICATE OF A FIRST DEVICE, PUBLICLY AVAILABLE INFORMATION OF THE FIRST DEVICE, AND A PUBLIC AUTHENTICATION KEY OF THE FIRST DEVICE

404 — RECEIVING A SECOND MESSAGE INCLUDING A SCAN RESPONSE, A SECOND CERTIFICATE OF A SECOND DEVICE THAT RECEIVED THE FIRST MESSAGE, PUBLICLY AVAILABLE INFORMATION OF THE SECOND DEVICE, AND A PUBLIC AUTHENTICATION KEY OF THE SECOND DEVICE

406 — TRANSMITTING A THIRD MESSAGE TO THE SECOND DEVICE, THE THIRD MESSAGE INCLUDING A PAIRING REQUEST AND AN ENCRYPTED NETWORK KEY

408 — RECEIVING A FOURTH MESSAGE FROM THE SECOND DEVICE, THE FOURTH MESSAGE INCLUDING A PAIRING RESPONSE

(51) Int. Cl.

| | |
|---|---|
| ***H04W 12/041*** | (2021.01) |
| ***H04W 12/0431*** | (2021.01) |
| ***H04W 12/069*** | (2021.01) |
| ***H04W 12/50*** | (2021.01) |

(52) U.S. Cl.
CPC ..... *H04W 12/041* (2021.01); *H04W 12/0431* (2021.01); *H04W 12/50* (2021.01); *H04L 2209/80* (2013.01)

(58) Field of Classification Search
CPC . H04L 9/0861; H04L 2209/80; H04L 9/3263; H04L 9/3273
See application file for complete search history.

(56) References Cited

U.S. PATENT DOCUMENTS

| | | | |
|---|---|---|---|
| 2009/0141692 | A1 | 6/2009 | Kasslin et al. |
| 2019/0289059 | A1 | 9/2019 | Vanahalli et al. |
| 2022/0231525 | A1 | 7/2022 | Xhafa et al. |
| 2023/0016828 | A1 | 1/2023 | Cohen-Bacrie et al. |

FOREIGN PATENT DOCUMENTS

| | | | | |
|---|---|---|---|---|
| WO | 9731450 | A1 | 8/1997 | |
| WO | 2006075900 | A1 | 7/2006 | |
| WO | WO-2008050944 | A1 * | 5/2008 | ............... H04L 9/30 |
| WO | WO-2009036792 | A1 * | 3/2009 | ............ H04W 40/22 |
| WO | WO-2020182271 | A1 * | 9/2020 | ......... H04L 41/0893 |

* cited by examiner

WIRELESS BATTERY MANAGEMENT SYSTEM SETUP

CROSS REFERENCE TO RELATED APPLICATIONS

This application is a continuation of application Ser. No. 17/399,793, filed Aug. 11, 2021, currently pending and scheduled to grant as U.S. Pat. No. 12,047,778 on Jul. 23, 2024, which is incorporated herein by reference in its entirety.

BACKGROUND

A battery management system may manage rechargeable batteries by monitoring cell-voltage, temperature, and/or other factors for the safe and efficient operation of the battery, such as a battery or batteries of electric vehicles. Some battery management systems may communicate via wired communication where a main controller is coupled to a battery module which is coupled to other battery modules in a daisy chain. Other battery management systems may communicate via wireless communication where the main controller communicates wirelessly with the battery modules, such as according to a Wireless Battery Management System (WBMS) protocol.

SUMMARY

Aspects of this description provide for a computer program product comprising computer executable instructions. In at least some examples, the instructions are executable by a controller to cause the controller to broadcast, in a data frame, a scan request to a node, the scan request including a certificate of the controller and a public authentication key of the controller, receive, in the data frame, a scan response from the node, the scan response including a certificate of the node and a public authentication key of the node, and perform pairing between the controller and the node based on the public authentication key of the node and a private authentication key of the controller.

Other aspects of this description provide for a method. In some examples, the method includes broadcasting a first message, the first message including a scan request, a first certificate of a first device, publicly available information of the first device, and a public authentication key of the first device, receiving a second message, the second message including a scan response, a second certificate of a second device that received the first message, publicly available information of the second device, and a public authentication key of the second device, transmitting a third message, the third message transmitted to the second device, and the third message including a pairing request and an encrypted network key, and receiving a fourth message, the fourth message received from the second device, and the fourth message including a pairing response.

Other aspects of this description provide for a system. In some examples, the system includes a battery module and a controller. The controller is configured to broadcast a first message, the first message including a scan request, a first certificate of the controller, publicly available information of the controller, and a public authentication key of the controller. The controller is also configured to receive a second message from the battery module, the second message including a scan response, a second certificate of the battery module, publicly available information of the battery module, and a public authentication key of the battery module. The controller is also configured to transmit a third message to the battery module, the third message including a pairing request and an encrypted network key. The controller is also configured to receive a fourth message from the battery module, the fourth message including a pairing response.

BRIEF DESCRIPTION OF THE DRAWINGS

For a detailed description of various examples, reference will now be made to the accompanying drawings in which.

DETAILED DESCRIPTION

For battery modules that interact wirelessly with a controller, communication between the controller and the battery modules may occur according to a Wireless Battery Management System (WBMS) protocol. Communication according to the WBMS protocol may occur in superframes, where a superframe includes a downlink message from the controller and uplink responses from the battery modules responsive to that downlink message. To prevent malicious activity such as the transmitting of inaccurate data, injection of malicious or corrupted data, or unauthorized observation of data, communication according to the WBMS protocol may occur via a secure communication channel. Certain application environments may place maximum time requirements on the formation of the secure communication channel. To satisfy the maximum time requirements, the secure communication channel may be formed by concurrently performing mutual authentication of the controller and the battery module(s) and key exchange between the controller and the battery module(s). Based on the key exchange, a network key may be generated for encrypting and decrypting communication between the controller and the battery module(s).

Figure 1:
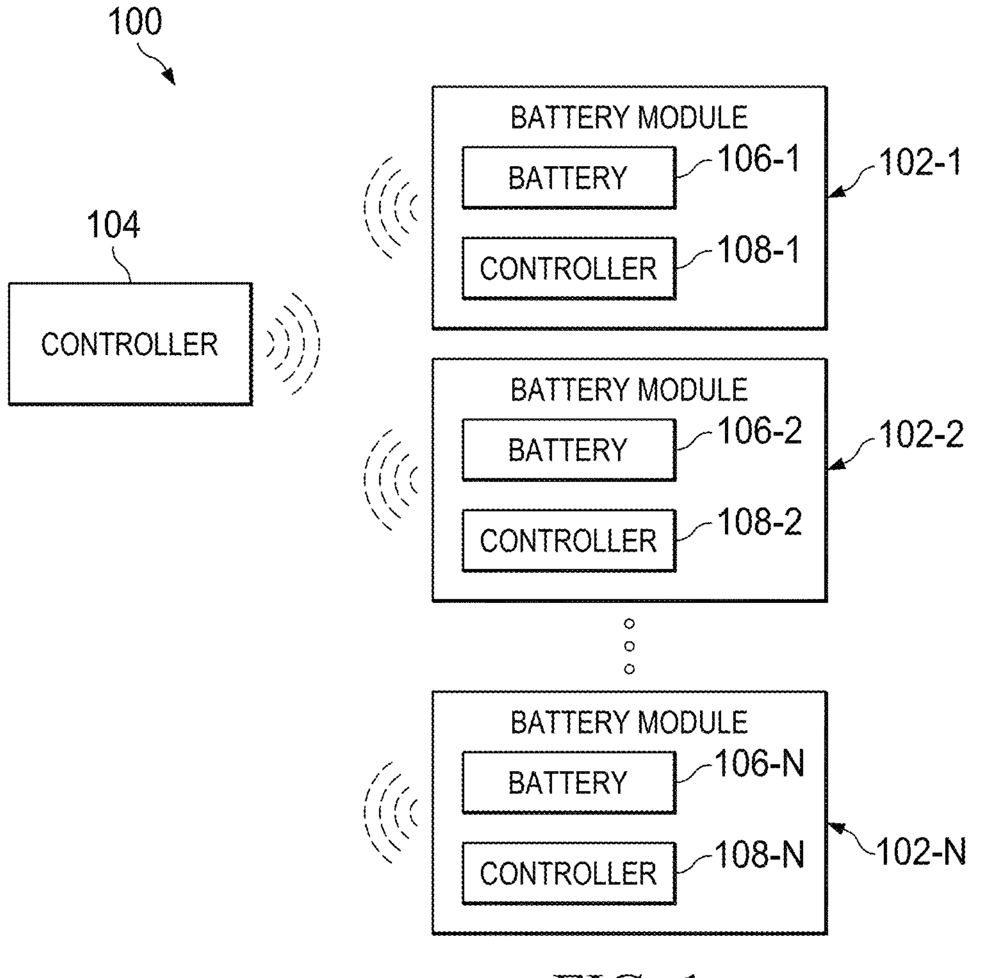
FIG. 1 is a block diagram of a battery system in accordance with various examples.

FIG. 1 is a block diagram of a battery system 100 in accordance with various examples. The battery system 100 may be implemented in an application environment such as an electrical vehicle, a hybrid vehicle, or the like. In at least some examples, the battery system 100 includes battery modules 102 (respectively indicated as battery 102-1, 102-2, . . . , 102-N) and a controller 104. While three battery modules 102 are shown in FIG. 1, in various examples the battery system 100 may include any number of battery modules 102. Each battery module 102 may include a battery 106 and a controller 108 (respectively indicated as battery 106-1, 106-2, . . . , 106-N and controller 108-1, 108-2, . . . , 108-N). The battery 106 may include any number of individual batteries or battery cells that may be coupled together according to any suitable configuration (e.g., serial and/or parallel). In at least some examples, the battery modules 102 are coupled together to form an aggregate battery having electrical characteristics determined according to a configuration of their coupling (e.g., serial and/or parallel). The controller 104 may be wirelessly coupled to the battery modules 102, such as to the controllers 108. Although not shown in FIG. 1, in at least some examples the controller 104 and/or the controllers 108 may include logic or other circuitry capable of processing, such as to implement instructions of a computer program product. For example, the controller 104 and/or the battery modules may include non-transitory storage mediums (not shown) that include or embody a computer program product comprising computer executable instructions. The logic or other circuitry capable of processing of the controller 104 and/or the controllers 108 may execute the computer executable instructions to perform actions.

In some examples, the controller 104 communicates with the battery modules 102 via the WBMS protocol. For example, the controller 104 may be a primary device that initiates communication with the battery modules 102 via downlink slots (DLs) of a data frame. The battery modules 102 may be node devices in the WBMS protocol. Each battery module 102 may respond to communication from the controller 104 in a respective uplink slot (UL) of the data frame. In at least some examples, the data frame may be a superframe. The superframe may include a DL communication from the controller 104 and each response provided by the battery modules 102 in an UL responsive to that DL communication. In at least some examples, the controller 104 may perform frequency hopping for each superframe, such that a second superframe is transmitted at a different frequency than a first superframe immediately preceding the second superframe.

In at least some examples, a wireless communication system may have certain vulnerabilities that may be at least partially mitigated in a wired communication system. Some of these vulnerabilities may include an ability for a third-party to act as a passive observer, illicitly viewing data being transmitted in the wireless communication system, insertion of malicious data into the wireless communication system, and/or a third-party providing a malicious node that provides false or inaccurate data. To combat these vulnerabilities, the wireless communication system may establish a network including a secure communication channel among the controller 104 and the battery modules 102. However, timing requirements may exist for establishment or formation of the network. Such timing requirements may exist to facilitate the impression of an "instant" startup of a device, such as an electric vehicle, in which the battery system 100 may be implemented. Conventional communications that occur to form the secure communication channel may create challenges in meeting the timing requirements for forming the network.

In at least some examples, the network among the controller 104 and the battery modules 102 is formed according to a joining process that includes scanning and pairing. The scanning may include the controller 104 transmitting a scan request. In some examples, the transmission of the scan request may be a broadcast transmission, while in other examples the transmission may be a multicast transmission. At least some of the battery modules 102 that receive the scan request may transmit a scan response to the controller 104. The battery modules 102 that transmit the scan response may select a UL for transmitting the scan response according to a clear channel assessment process or algorithm. In at least some examples, the controller 104 may acknowledge receipt of at least some of the scan responses in a next scan request transmitted by the controller 104. After receiving at least some scan responses, the controller 104 may begin pairing.

The pairing may include the controller 104 transmitting a pairing request. In some examples, the transmission of the pairing request may be a broadcast transmission, while in other examples the transmission may be a multicast transmission. In yet other examples, the transmission of the pairing request may be a unicast transmission made to each of the battery modules 102 from which the controller 104 received a scan response. At least some of the battery modules 102 that receive the pairing request may transmit a pairing response to the controller 104. The battery modules 102 that transmit the pairing response may select a UL for transmitting the pairing response according to a clear channel assessment process or algorithm. In at least some examples, the controller 104 may acknowledge receipt of at least some of the pairing responses in a next pairing request transmitted by the controller 104. After receiving at least some scan responses, the network may be established among the controller 104 and at least some of the battery modules 102, and data exchange may occur among the controller 104 and at least some of the battery modules 102.

To decrease an amount of time consumed in forming the network including the secure communication channel, in at least some examples, mutual authentication and key exchange may occur concurrently with the scanning and pairing. The mutual authentication may be a process by which the controller 104 and the battery modules 102 establish authenticity of each other, such as via certificates or some other suitable form of digital signature. The certificate may be a digital signature over publicly available information unique to the device providing the certificate, such as a device unique ID, using a private key of a trusted third party, such as Certificate Authority. A recipient of the certificate may verify authenticity of the certificate, and thereby the device providing the certificate, based on the publicly available information unique to the device providing the certificate and a public key (e.g., a public authentication key) of the trusted third party. The mutual authentication may facilitate a battery module 102 receiving a scan request to prove authenticity of the controller 104 and the controller 104 receiving a scan response to prove authenticity of the battery module 102 from which the scan response was received prior to the network being formed (e.g., pairing occurring).

The key exchange may be a process by which the controller 104 and the battery modules 102 exchange encryption keys, such as public encryption keys, for use in encrypting and/or decrypting data exchanged between the controller 104 and the battery modules 102 to form the secure communication channel described above. For example, based on the public encryption keys, the controller 104 and the battery modules 102 may derive, form, compute, or otherwise determine a network key upon which data exchanged between the controller 104 and the battery modules 102 may be encrypted and/or decrypted. For example, the secure communication channel may be established using a public key algorithm, such as Diffie-Hellman Key Exchange, or any other suitable key algorithm.

In at least some examples, the mutual authentication and key exchange may be integrated into setup of the network. For example, a conventional, or standalone, mutual authentication process may require the transmission of two messages and a conventional, or standalone, key exchange process may require the transmission of three messages. Conventional, or standalone, establishment of a network according to WBMS protocol may require the transmission of four messages. Thus, the addition of the increased security of mutual authentication and key exchange to a network formed among the controller 104 and the battery modules 102 may add additional latency to formation of the network, such as a cumulative nine transmitted messages. This may cause a time for formation of the network to exceed timing requirements for forming the network, as described above.

To mitigate the increased latency, in at least some examples, the mutual authentication and the key exchange may be incorporated in, or occur concurrently with, the scanning process of the network formation. Incorporating the mutual authentication and the key exchange in the scanning process of the network formation may, in at least some examples, may reduce a number of messages transmitted to form the secure communication channel to four messages.

As described above, the controller 104 may transmit a scan request to at least some of the battery modules 102. In at least some examples, a certificate of the controller 104, publicly available information of the controller 104 (e.g., as used in forming the certificate), and a public key of the controller 104 may also be transmitted in a DL with the scan request. A receiving battery module 102 may verify the certificate of the controller 104, as described above. Responsive to a failure to verify the certificate of the controller 104, the battery module 102 performing the verification may terminate a joining process for joining a network with the controller 104. Responsive to successfully verifying the certificate of the controller 104, the battery module 102 may transmit a scan response to the controller 104. In at least some examples, a certificate of the battery module 102, publicly available information of the battery module 102 (e.g., as used in forming the certificate), and a public key of the battery module 102 may also be transmitted in an UL with the scan response.

The controller 104 may verify the certificate of the battery module 102, as described above, and compute a shared secret according to the key of the battery module 102. For example, responsive to a failure to verify the certificate of the battery module 102, the controller 104 may terminate a joining process with the battery module 102. Responsive to successfully verifying the certificate of the battery module 102, the controller 104 may compute the shared secret according to the public key of the battery module 102 and a private key (e.g., private authentication key) of the controller 104. After computing the shared secret, the controller 104 may encrypt a network key according to the shared secret, which may also be referred to as an ephemeral key. The controller 104 may then transmit a pairing request to the battery module 102, as well as the encrypted network key in a same DL as the pairing request.

A battery module 102 receiving the pairing request and the encrypted network key may decrypt the encrypted network key according to the shared secret, which the battery module 102 computes according to the public key of the controller 104 and the private key of battery module 102. After, or concurrently with, decrypting the encrypted network key, the battery module 102 may transmit a pairing response to the controller 104 to complete formation of the network. The network may have a secure communication channel resulting from the mutual authentication and key exchange processes between the controller 104 and the battery module 102 and may have been performed in a reduced time when compared to a network formation process that includes standalone (e.g., not integrated, as described herein) formation of the network, mutual authentication, and key exchange processes.

Figure 2:
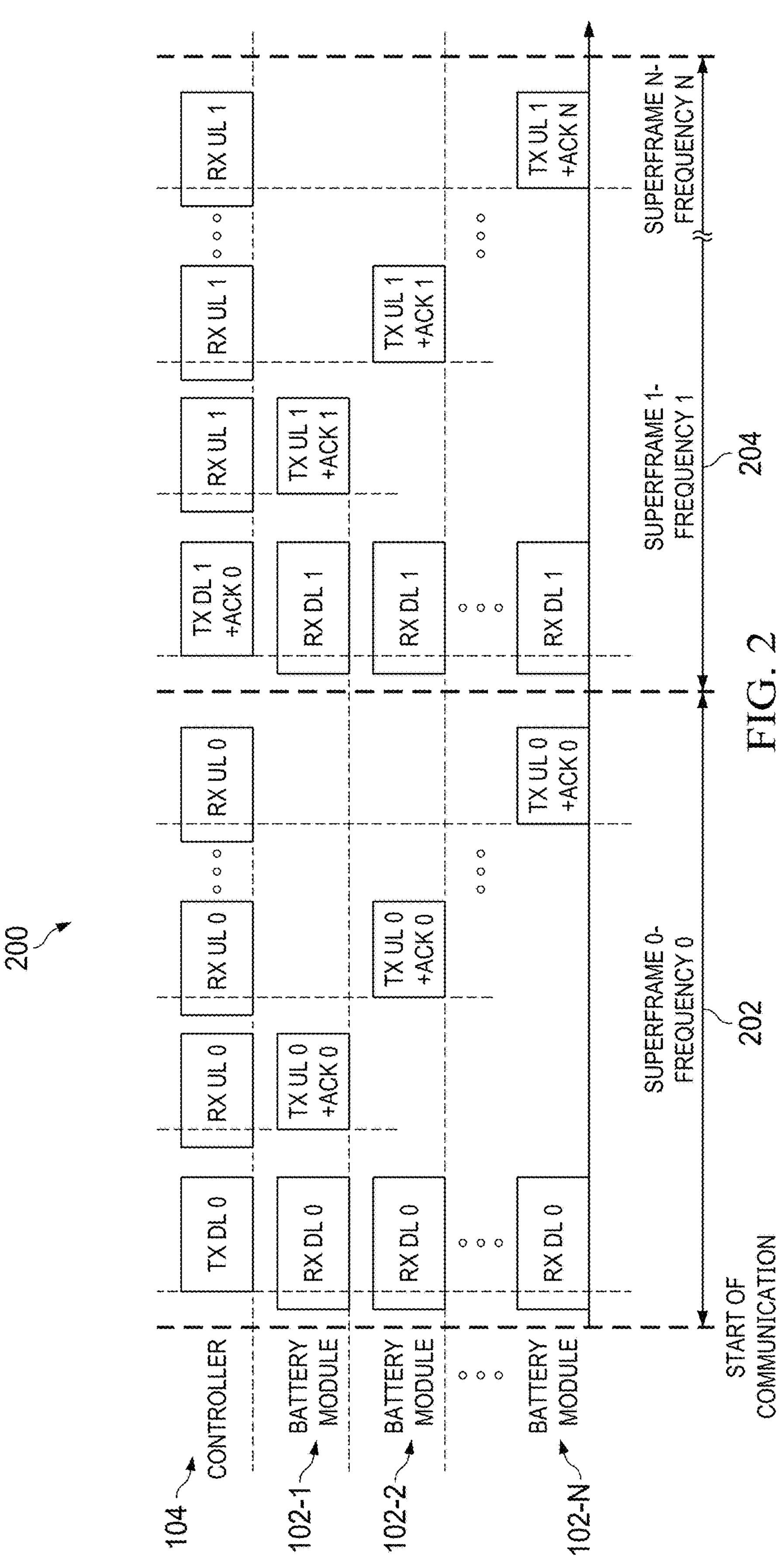
FIG. 2 is a diagram of a data frame in accordance with various examples.

FIG. 2 shows a diagram 200 of a data frame in accordance with various examples. The data frame may be representative of a data frame formed and transmitted to perform network formation, such as according to WBMS protocol, as described herein. In at least some examples, the data frame may be a superframe, as described above with respect to FIG. 1. Accordingly, reference may be made to at least some elements of FIG. 1 in describing FIG. 2.

As shown in FIG. 2, the controller 104 may transmit a message in a DL of the data frame 202, shown as TX DL0. The transmitted message may be received by at least some of the battery modules 102, shown as RX DL0. In response to receipt of the message from the controller 104, the battery modules 102 may transmit a message in a UL of the data frame 202 to the controller 104, with these messages being shown as TX UL0. The same UL may include an acknowledgment of receipt of the transmitted message from the controller 104, indicated as ACK 0. The messages transmitted by the battery modules 102 may be received by the controller 104, shown as RX UL0. In at least some examples, the data frame 202 is a superframe that includes a message transmitted in TX DL0 and each message transmitted in a TX UL0 responsive to the message transmitted in TX DL0. In at least some examples, the controller 104 may transmit a scan request message, a certificate of the controller 104, publicly available information of the controller 104, and a public key of the controller 104 in the TX DL0. In at least some examples, a battery module 102 may transmit a scan response message, a certificate of the battery module 102, publicly available information of the battery module 102, and a public key of the battery module 102 in a respective TX UL0.

The data frame 204 may also be a superframe that includes a message transmitted in a DL of the data frame 204, shown as TX DL1. The same DL may include an acknowledgment of receipt by the controller 104 of the transmitted message from the battery module 102, indicated as ACK 0. The data frame 204 may also include each response transmitted in a UL responsive to the message transmitted in TX DL1. In at least some examples, communication of the data frame 204 may be transmitted at a different frequency than that of the data frame 202. In at least some examples, the controller 104 may transmit a pairing request message and an encrypted network key in the TX DL1. In at least some examples, a battery module 102 may transmit a pairing response message in a TX UL1 of that battery module 102. In at least some examples, the data frame 240 is a superframe that includes a message transmitted in TX DL1 and each message transmitted in a TX UL1 responsive to the message transmitted in TX DL1.

Figure 3:
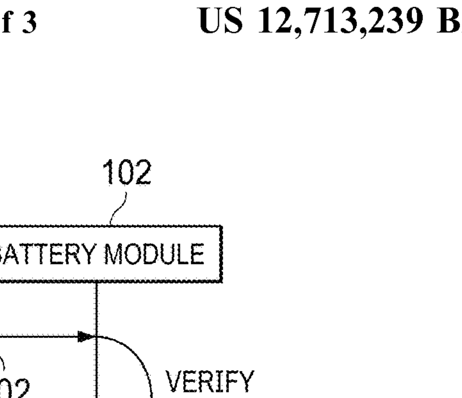
FIG. 3 is a communication diagram in accordance with various examples.
Figure 3:
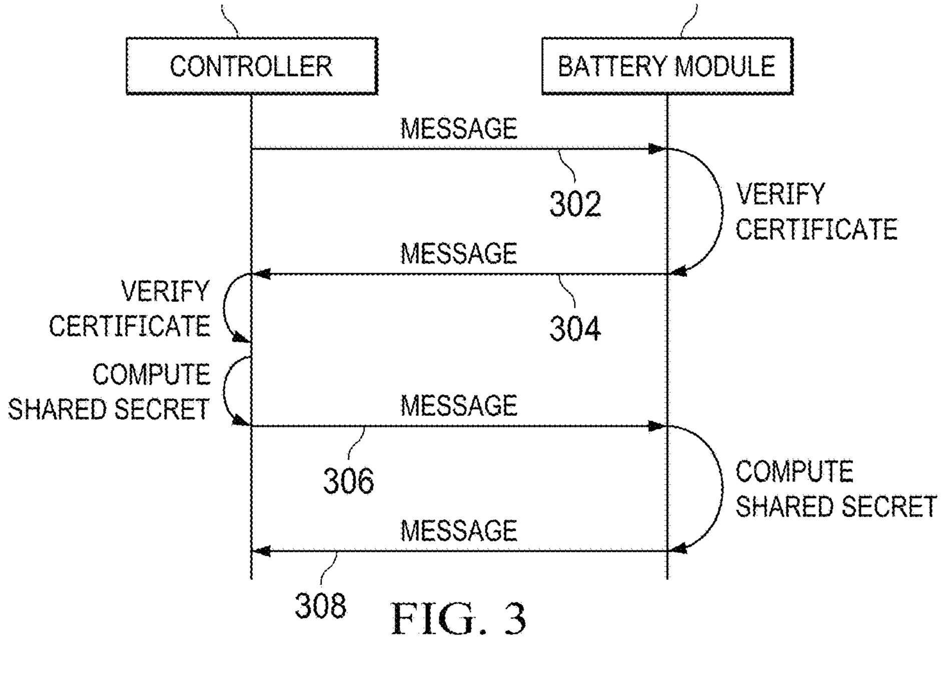

FIG. 3 shows a communication diagram 300 in accordance with various examples. In at least some examples, the communication diagram 300 shows communication that may occur in forming a network in the battery system 100 of FIG. 1. Accordingly, reference may be made to at least some elements of FIG. 1 in describing FIG. 3. While the communication diagram 300 shows communication between the controller 104 and a single representative battery module 102, in some implementations substantially similar communication may occur between the controller 104 and other, unshown, battery modules 102. In at least some examples, the communication of the communication diagram 300 may be performed by the controller 104 and/or the battery modules 102 (e.g., such as via the controllers 108) executing computer executable instructions embodied in a computer program product.

In at least some examples, the controller 104 may transmit a message 302 to a battery module 102. The message 302 may be transmitted as a broadcast message received by multiple battery modules 102. In at least some examples, the message 302 includes a scan request, a certificate of the controller 104, publicly available information of the controller 104 (e.g., as used in forming the certificate of the controller 104), and a public key of the controller 104.

The battery module 102 may receive the message 302 and verify the certificate of the controller 104, as described above. Responsive to verification of the certificate of the controller 104, the battery module 102 may transmit a message 304 to the controller 104. The message 302 may be transmitted as a unicast message received by controller 104. In at least some examples, the message 304 includes a scan response, a certificate of the battery module 102, publicly available information of the battery module 102 (e.g., as used in forming the certificate of the battery module 102), and a public key of the battery module 102. In at least some examples, the battery module 102 may compute a shared secret response to verification of the certificate of the controller. The shared secret may be computed according to any suitable key algorithm and may be based at least in part on the public key of the controller 104 and/or the private key of the battery module 102.

The controller 104 may receive the message 304 and verify the certificate of the battery module 102, as described above. Responsive to verification of the certificate of the battery module 102, the controller 104 may compute a shared secret. The shared secret may be computed according to any suitable key algorithm and may be based at least in part on the private key of the controller 104 and/or the public key of the battery module 102. In at least some examples, the shared secret may be unique to the controller 104 and the battery module 102 such that a different shared secret may exist between the controller 104 and another battery module 102. Subsequent to computing the shared secret, the controller may transmit a message 306 to the battery module 102. The message 306 may be transmitted as a unicast message received by the battery module 102. In at least some examples, the message 306 includes a pairing request and an encrypted network key that may be useful for encrypting and/or decrypting communication between the controller 104 and the battery module 102.

The battery module 102 may receive the message 306 and decrypt the encrypted network key according to the shared secret, which the battery module 102 computes according to the public keys of the controller 104 and the battery module 102, as described above. Subsequent to, or concurrently with, decrypting the encrypted network key, the battery module 102 may transmit a message 308 to the controller 104. The message 308 may be transmitted as a unicast message received by controller 104. In at least some examples, the message 308 includes a pairing response.

Figure 4:
FIG. 4 is a flowchart of a method in accordance with various examples.
Figure 4:
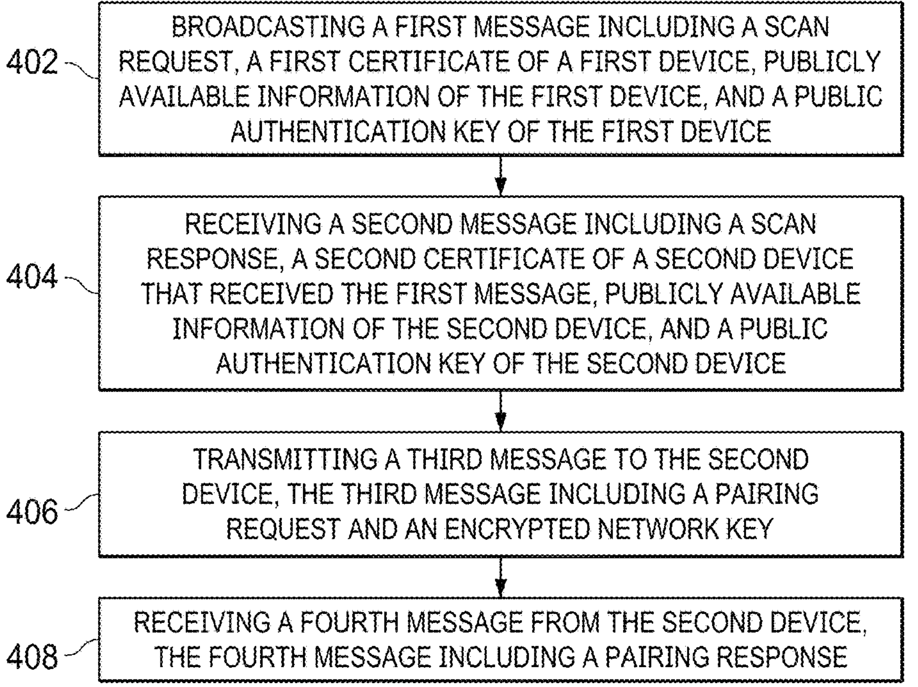

FIG. 4 shows a flowchart of an example method 400 in accordance with various examples. In at least some examples, the method 400 is implemented by the battery system 100, such as by the controller 104 and/or the battery modules 102. The method 400 may be implemented to establish a communication network having a secure communication channel. For example, the network may be a network between the controller 104 and at least some of the battery modules 102, having a secure communication channel between the controller 104 and at least some of the battery modules 102. In at least some examples, the method 400 may be performed by the controller 104 and/or the battery modules 102 (e.g., such as via the controllers 108) executing computer executable instructions embodied in a computer program product.

At operation 402, a first message is broadcast. The first message may be broadcast, for example, by a first device. In some implementations, the first device is the controller 104. The first message may include a scan request, a first certificate of the first device, and a public authentication key of the first device. In at least some examples, responsive to receipt of the first message, a second device that receives the first message may authenticate the first device. For example, the second device may authenticate the first device according to the first certificate of the first device and the publicly available information of the first device. Responsive to receipt of the first message, the second device may transmit a second message to the first device.

At operation 404, the second message is received. The second message may be received, for example, by the first device from the second device. In some implementations, the second device is a battery module 102. The second message may include a scan response, a second certificate of the second device, publicly available information of the second device, and a public authentication key of the second device. In at least some examples, responsive to receipt of the second message, the first device may authenticate the second device. For example, the first device may authenticate the second device according to the second certificate of the second device and the publicly available information of the second device. In at least some examples, responsive to receipt of the second message, the first device may compute a shared secret and an encrypted network key. For example, the first device may compute the shared secret according to the public authentication key of the second device and a private authentication key of the first device and may compute the encrypted network key according to the computed shared secret.

At operation 406, a third message is transmitted. In at least some examples, the third message is transmitted by the first device to the second device. The third message may include a pairing request and an encrypted network key. In at least some examples, responsive to receipt of the third message, the second device may compute a shared secret. For example, the second device may compute the shared secret according to the public authentication key of the first device and a private authentication key of the second device. In other examples, the second device may compute the shared secret at any other suitable operation of the method 400, such as at any time after the second device has received the public authentication key of the first device transmitted at operation 402 (e.g., such as responsive to receipt of the first message). In at least some examples, the second device may receive the third message decrypt the encrypted network key according to the shared secret, and transmit a fourth message to the first device.

At operation 408, the fourth message is received. The fourth message may be received, for example, by the first device from the second device. The fourth message may include a pairing response. Responsive to receipt of the pairing response, the first device may form a secure communication channel between the first device and the second device, as described elsewhere herein.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means+/−10 percent of the stated value. Modifications are possible in the described examples, and other examples are possible within the scope of the claims.

The invention claimed is:

1. A device comprising:
a transceiver configurable to:
transmit a scan request; and
receive a scan response from a node after transmitting the scan request, wherein the scan response includes a public authentication key of the node; and
a logic circuit configurable to:
encrypt a network key based on the public authentication key of the node and based on a private authentication key of the device; and
cause the transceiver to transmit a pairing request including the encrypted network key.

2. The device of claim 1, wherein the logic circuit is configurable to:
generate a shared secret based on the public authentication key of the node and the private authentication key of the device; and
encrypt the network key according to the shared secret.

3. The device of claim 1, wherein the transceiver is configurable to:
receive a pairing response from the node after transmitting the pairing request; and
receive first data from the node, wherein the first data is encrypted according to the network key,
wherein the logic circuit is configurable to decrypt the first data according to the network key.

4. The device of claim 1, wherein the node is a first node, and wherein the transceiver is configurable to:
receive a second scan response from a second node, wherein the second scan response includes a public authentication key of the second node; and
perform pairing between the device and the second node based on the public authentication key of the second node and the private authentication key of the device.

5. The device of claim 1,
wherein the scan response includes a certificate of the node, and
wherein the logic circuit is configurable to:
verify authenticity of the node according to the certificate of the node; and
compute a shared secret according to a public authentication key of the device and the public authentication key of the node.

6. The device of claim 5, wherein the transceiver is configurable to transmit the scan request including the public authentication key of the device.

7. The device of claim 5, wherein the logic circuit is configurable to not enter a pairing state with the node if the logic circuit cannot verify the certificate of the node.

8. The device of claim 1, wherein to transmit the scan request, the transceiver is configurable to broadcast the scan request to a plurality of nodes including the node.

9. A device comprising:
a transceiver configurable to:
receive a scan request from a primary node, wherein the scan request includes a certificate of the primary node and a public authentication key of the primary node; and
receive a pairing request from the primary node including an encrypted network key; and
a logic circuit configurable to:
verify the certificate of the primary node;
cause the transceiver to transmit a scan response; and
decrypt the encrypted network key using a public authentication key of the device and the public authentication key of the primary node.

10. The device of claim 9, wherein the logic circuit is configurable to:
generate a shared secret based on the public authentication key of the primary node and a private authentication key of the device; and
decrypt the encrypted network key according to the shared secret.

11. The device of claim 9, wherein the logic circuit is configurable to:
encrypt data using the decrypted network key; and
cause the transceiver to transmit the encrypted data to the primary node.

12. The device of claim 9, wherein the logic circuit is configurable to cause the transceiver to transmit the scan response including a certificate of the device.

13. The device of claim 9, wherein the logic circuit is configurable to transition to an unconnected state if the logic circuit cannot verify the certificate of the primary node.

14. The device of claim 9, wherein the transceiver is configurable to:

receive the scan request in a data frame; and transmit the scan response in the data frame.

15. A method comprising:

receiving, by a device, a scan request from a primary node, wherein the scan request includes a certificate of the primary node and a public authentication key of the primary node;

verifying the certificate of the primary node;

transmitting a scan response;

receiving a pairing request from the primary node including an encrypted network key; and decrypting the encrypted network key using a public authentication key of the device and the public authentication key of the primary node.

16. The method of claim 15, further comprising:

generating a shared secret based on the public authentication key of the primary node and a private authentication key of the device; and decrypting the encrypted network key according to the shared secret.

17. The method of claim 15, further comprising:

encrypting data using the decrypted network key; and transmitting the encrypted data to the primary node.

18. The method of claim 15, further comprising transmitting the scan response including a certificate of the device.

19. The method of claim 15, further comprising transitioning to an unconnected state if the certificate of the primary node cannot be verified.

20. The method of claim 15, wherein the scan request is received in a data frame; and wherein the scan response is transmitted in the data frame.

* * * * *